J. E. MILLER.
POULTRY NEST.
APPLICATION FILED JULY 20, 1916.

1,222,650.

Patented Apr. 17, 1917.
2 SHEETS—SHEET 1.

Witness
Roland J. Booth

Inventor
J. E. Miller
by H. B. Willson & Co.
Attorneys

J. E. MILLER.
POULTRY NEST.
APPLICATION FILED JULY 20, 1916.
1,222,650.
Patented Apr. 17, 1917.
2 SHEETS—SHEET 2.
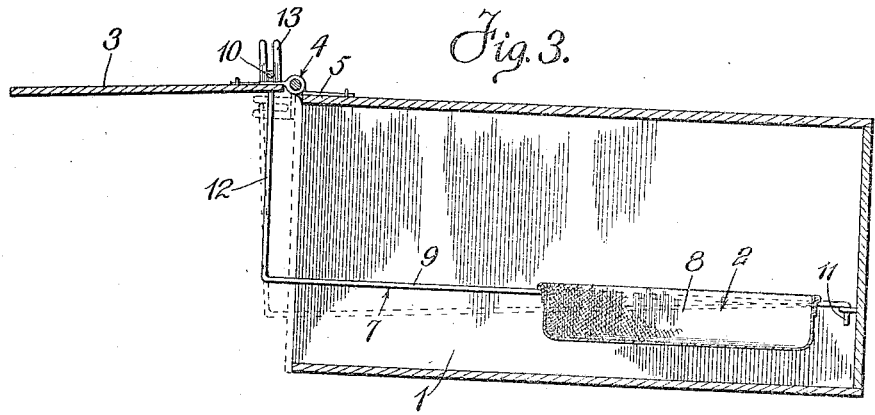
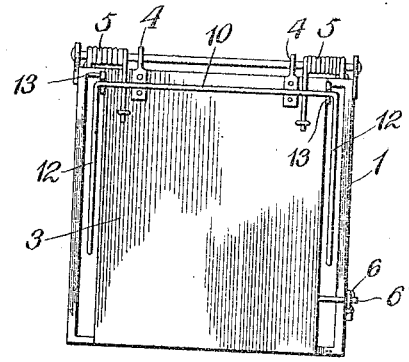
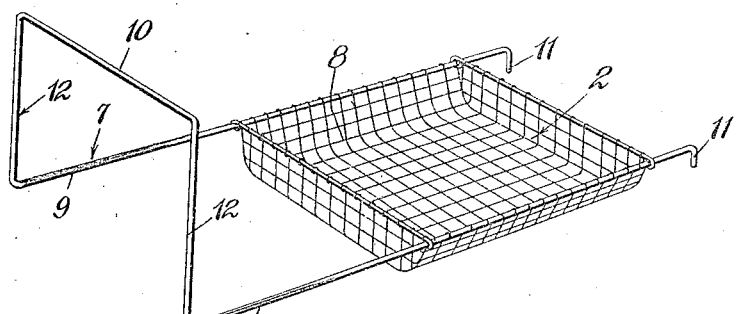
Witness
Roland T. Booth
Inventor
J. E. Miller
by H. B. Willson & Co.
Attorneys

UNITED STATES PATENT OFFICE.

JACOB EMANUEL MILLER, OF COON RAPIDS, IOWA.

POULTRY-NEST.

1,222,650.  Specification of Letters Patent.  Patented Apr. 17, 1917.

Application filed July 20, 1916. Serial No. 110,357.

*To all whom it may concern:*

Be it known that I, JACOB E. MILLER, a citizen of the United States, residing at Coon Rapids, in the county of Carroll and State of Iowa, have invented certain new and useful Improvements in Poultry-Nests; and I do declare the following to be a full, clear, and exact description of the invention, such as will enable others skilled in the art to which it appertains, to make and use the same.

This invention relates to new and useful improvements in poultry nests, and the object is to provide means for automatically closing the entrance to the nest when the same is occupied by a fowl so that other poultry cannot gain access thereto.

An additional object is to provide a device of this character which is so constructed that the nest proper can be readily removed from the coop and repaired or cleaned.

With these and other objects in view, my invention resides in the novel features of construction, combination and arrangement of parts which will be hereinafter more particularly described and claimed and shown in the drawing wherein:

Fig. 3 is a central vertical longitudinal section;

Fig. 4 is a front end view with the closure shut;

Fig. 5 is a detail perspective view of the nest carrying frame.

Figure 1:
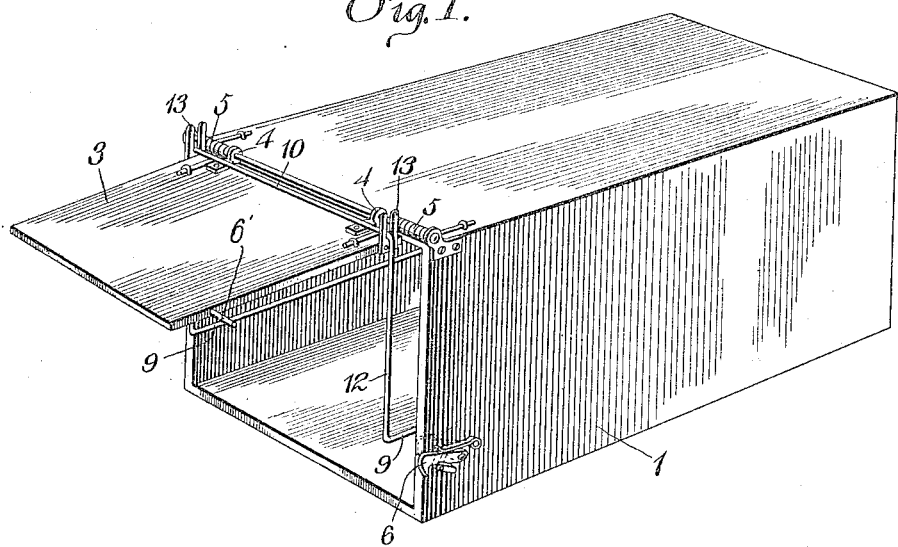
Figure 1 is a perspective view showing the exterior construction of my improved poultry nest.
Figure 2:
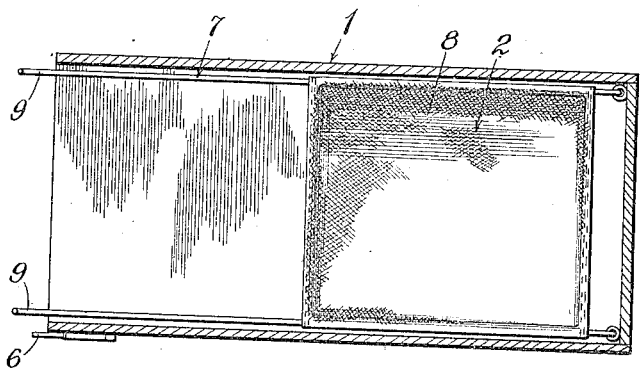
Fig. 2 is a horizontal section showing the interior construction.

Referring more particularly to the drawing it will be seen that this improved poultry nest comprises a coop 1 and a nest proper 2, the former being constructed in any desired shape and size and of any preferred material. The coop, however, is preferably constructed as shown in the drawing wherein it is made rectangular and of boxlike construction. One end of the coop is provided with a closure 3 which is hinged at its upper edge to the top of the box or coop as shown at 4, and this closure is normally retained in open elevated position by means of the springs 5, one of which is disposed adjacent each side of the closure. Instead of the springs 5 it is obvious that a weight or other device may be used to hold the closure normally open. In order to hold the door or closure 3 in lowered or shut position, a pivoted catch 6 is provided to engage a pin 6' as shown.

The nest proper consists of a frame 7 and an egg receptacle 8, the latter of which may be formed of any desired material such as wire netting or the like which may be readily cleaned when necessary. The frame 7 is substantially U-shaped, the arms thereof being designated by the numerals 9, while the cross bar which connects one end of said arms is indicated by 10. The arms are spaced apart a suitable distance to be disposed one on each side of the egg receptacle 8 and are secured thereto by any suitable means. The free ends of the arms 9 extend beyond the rear edge of the egg receptacle 8 and are turned downwardly to form hooked fingers 11. The other or connected end of the arms 9 is bent upwardly substantially at right angles to the main portion as shown at 12.

When the nest 2 is to be placed in the coop 1 the hooked fingers 11 are caught in eyes or the like formed on the inner face of the rear end of the coop and the cross bar 10 disposed over the outer surface of the closure 3, said closure being provided on its opposite edges with notched ears 13 which form bearings for the reception of the bar 10. When the parts are in this position, the tension of the springs 5 will cause the closure to raise to its open position, thus raising the nest 2 above the bottom of the coop. It is sometimes preferable to construct the coop 1 or parts thereof of netting or similar material, and in such a case the hooked fingers 11 are disposed in suitable openings in the rear wall of the coop.

After the parts have been arranged, as described, it is obvious that as soon as a fowl enters the coop and steps into the egg receptacle 8, its weight will cause the latter to lower and thus to close the door 3, thereby preventing the further entrance of poultry until said fowl has stepped out of the egg receptacle. When it is desired to remove the nest 2 the cross bar 10 of the frame 7 is lifted from its seats in the ears 13, whereupon the hooked fingers 11 may be released from the eyes or the like on the rear of the coop and the whole lifted out of the coop.

In case it should be necessary or desirable to trap the fowl upon the nest in order to examine the same or for any other purpose, the pivoted catch 6 is adjusted so that when the closure 3 is shut by the weight of the fowl in the egg receptacle, it will drop down and hold the door closed against the tension of its springs until manually released.

From the foregoing description taken in connection with the accompanying drawing, it is obvious that I have invented an extremely simple poultry nest which can be easily and quickly taken apart for cleaning or other purposes. It is also evident that the nest may be constructed in any desired size or shape without departing from the scope of the invention as defined by the appended claims.

I claim:—

1. In a device of the class described, a coop having one end open, a closure pivoted at the top of the opening of said coop to swing upwardly and outwardly, means for retaining said closure normally open, a nest therein having a U-shaped frame, and an egg receptacle secured between the arms of said frame adjacent the free ends thereof, the free ends of the arms of said frame being pivotally connected to the end of said coop, the connected ends of the arms of said frame being bent upwardly at right angles to the main portion of the arms, the cross bar of said U-shaped frame being disposed over the outer surface of said closure and in contact therewith, whereby when a fowl steps into the egg receptacle said closure will shut.

2. In a device of the class described, a coop, a normally open closure therefor, a nest therein comprising a U-shaped frame, and an egg receptacle secured between the arms of said frame adjacent the free ends thereof, hooked fingers formed on the free ends of the arms of said frame, the connected ends of the arms of said frame being bent upwardly at right angles to the main portion of the arms, said hooked fingers being pivotally engaged with the rear end of said coop, the cross bar of said U-shaped frame being disposed over the outer surface of said closure, a pair of notched ears secured to said closure to receive said crossbar, whereby when a fowl steps in the egg receptacle said closure will shut, and a pivoted catch for holding said closure in closed position.

In testimony whereof I have hereunto set my hand in the presence of two subscribing witnesses.

JACOB EMANUEL MILLER.

Witnesses:
ARTHUR S. KIRK,
H. E. MITCHELL.

Copies of this patent may be obtained for five cents each, by addressing the "Commissioner of Patents, Washington, D. C."